June 23, 1970 R. G. RYNDERS 3,517,130
COMMUNICATION MULTIPLEXING CIRCUIT
FEATURING NON-SYNCHRONOUS SCANNING
Filed Oct. 26, 1966 2 Sheets-Sheet 1

INVENTOR
RAYMOND G. RYNDERS
BY Joseph C Redmond, Jr.
ATTORNEY

United States Patent Office 3,517,130
Patented June 23, 1970

3,517,130

COMMUNICATION MULTIPLEXING CIRCUIT FEATURING NON-SYNCHRONOUS SCANNING

Raymond G. Rynders, Wappingers Falls, N.Y., assignor to International Business Machines Corporation, Armonk, N.Y., a corporation of New York Filed Oct. 26, 1966, Ser. No. 589,549
Int. Cl. H03j 3/16
U.S. Cl. 179—15 11 Claims

ABSTRACT OF THE DISCLOSURE

A multiplexing circuit that selectively accesses one of a plurality of data stations to a common receiving terminal. The circuit internaly generates a scan signal that continuously examines the status of the data station until a data station provides a request signal indicating access is required to the common receiving station whereupon the circuit terminates the scan signal and provides an assign signal which accesses the data station directly to the common receiving terminal so long as the request signal is present.

This invention relates to communication multiplexing circuits. More particularly, the invention relates to a multiplexer or scanner for a plurality of data stations.

Multiplexing circuits find use in information handling systems for the orderly connection of a plurality of data stations or terminals to a data processor or computer. All data stations compete for access to the data processor. The multiplexer or scanner selects among the data stations, based on one or more criteria, and connects a station to the data processor. As "real time" applications of data stations become more prevalent, the requirements for a multiplexer are increased. One factor of importance relative to multiplexer circuits is the speed with which the data stations are serviced. Another factor is flexibility in servicing data stations with different data rates. Another factor is establishing a priority for selecting among the data stations.

Data stations, in the past, have been connected to a data processor through either a star arrangement or a common data bus. The star arrangement, as shown in U.S. Pat. 3,077,984, employs a central multiplex buffer which is connected to a plurality of input/output devices over separate data buses. A multiplex circuit for such a buffer, therefore, must be able to scan the individual data buses in a parallel manner. The multiplex circuit for the common data bus, in contrast, scans the plurality of data stations in a serial manner. One multiplex circuit of this type is described in Ser. No. 357,369, filed Apr. 6, 1964, and assigned to the same assignee as that of the present invention. Common bus or "bootstrap" communication systems or channels are more prevalent in present day "real time" data processing systems. The common bus channel simplifies priority circuits, interrupt circuits and the like relative to the parallel or star type channels. The present invention, therefore, is directed to an improved multiplexing circuit or scanner for a common bus channel.

Multiplex circuits or scanners for common bus channels include a pulse circuit for generating a search signal. The search signal is sent to the data stations in sequence to determine whether or not the data station has an active request. When no data station is active, the pulse circuit is reset and then set to repeat the process. When a data station is active, the search signal initiates service to the station by the data processor or like. The search signal is reactivated after the data station has been serviced.

Service to the data stations, therefore, is controlled by apparatus separate and distinct from the data stations. Since input/output units require service within selected periods, the number of such units connected to the channel is limited by the speed of the channel multiplexing circuit and/or the time required to provide service after a request is recognized. Naturally, it is desirable to increase the number of data stations that can be connected to a channel.

Another area of improvement for common bus channel is in priority circuits which rate the data stations and permit the station with the highest priority to be connected to the data processor. Priority can be established on the basis of the data rate of the data station, the time period from last service or the like. Priority may also be established among a plurality of data stations by the data station with the higher data rates being physically located closest to the data processor. In all forms of present priority systems it is possible that the data station with a low data rate may never receive service. Multiplexing circuits, therefore, which overcome this limitation would be a desirable contribution to the art.

The present invention, therefore, is directed to improvement in the areas noted as well as in the areas of reduced hardware requirements and ease of modifying the circuit.

A general object of the invention is a multiplexing circuit or scanner for communication systems which is rapid, versatile, flexible in operation and simple in construction.

Another object is a multiplexer circuit or scanner employing a loop oscillator for channel scanning purposes.

Another object is a data station adapted to generate or repeat a pulse as a search signal.

Another object is a multiplexer circuit or scanner adapted for priority selection among a plurality of data stations.

Still another object is the adaption of a loop oscillator circuit for a priority channel scanning system.

These and other objects and features are accomplished in accordance with the present invention, one illustrative embodiment of which comprises a plurality of data stations connected to a common bus terminated by a receiving terminal, data processor, computer or the like. Each data station is connected to a control circuit by a request line and an assignment line. Each control circuit comprises logic and delay means. All control circuits are connected together in a loop. A switching circuit is connected in the feedback or return portion of the loop. The switching circuit alters the electrical state of the control circuits from an active to a passive condition or vice versa. When an active state is generated, a wave front is propagated through each of the control circuits until it appears at the switching circuit whereupon it is converted into a passive state. The passive state propagates around the loop ultimately causing the switching circuit to change the loop state to an active state. This cyclic action continues at a frequency determined by the magnitudes of delays in the control circuits. The wave front of the passive state is employed as a search signal among the data stations. Should a request line be activated by a data station, the control circuit logic of the data station responds to the wave front and prevents the establishment of the passive state in the loop. The ring is "locked up" with the data station receiving an "assign signal" via the assignment line. The data station then proceeds to transmit data over the common bus to the receiving terminal. The ring remains in this "locked up" state until the request line goes passive signifying the end of data station operation, at which time normal scanning operation resumes. This type of operation results for any data station when the request line associated therewith becomes active.

A plurality of common bus communication systems may be linked together in a composite scanning system which features a flexible priority system. The priority system is accomplished by steering the propagating active and passive states through individual branches in a predetermined but readily alterable sequence. A counter is suitably connected to the loops. A single shot is connected to the counter to selectively steer the propagating active and passive states through the various loops.

A general feature of the present invention is a plurality of data stations including internal means to generate a search signal among the data stations.

Another feature is a plurality of data stations responsive to an internally generated search signal to connect a data station, indicating a need for service, to a communication bus and terminating the search signal until the data station has been serviced.

Another feature is a plurality of data stations, each including a control circuit and adapted to function as an oscillator when connected together in a loop.

Another feature is a plurality of control circuits connected in a loop and including switching means to establish cyclically an active and a passive state in the loop, the transition from the active to the passive state serially passing through the control station as a search signal.

Another feature is a plurality of loops including control circuits and a ring counter controlled by a single shot, the ring counter in combination with the single shot controlling the passage of a transitional front from loop to loop as a priority weighted selection system.

The foregoing and other objects, features and advantages of the invention will be apparent from the following more particular description of the preferred embodiments of the invention, as illustrated in the accompanying drawings.

Figure 3:
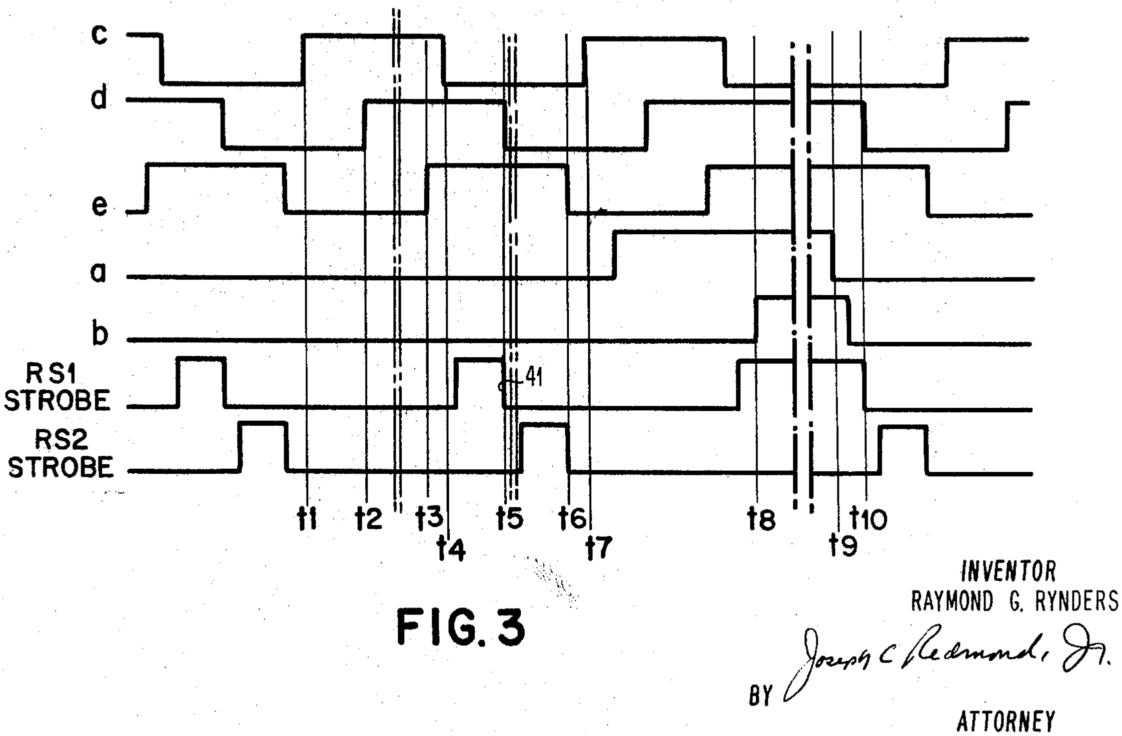
FIG. 3 is a wave form diagram of the operation of the control circuits shown in FIG. 2.
Figure 4:
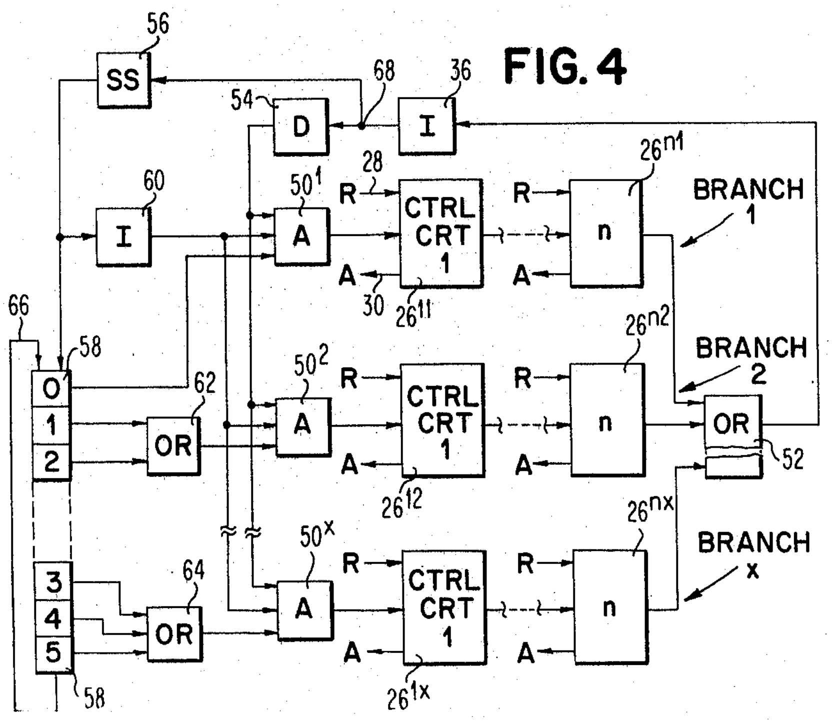

And, FIG. 4 is an electrical schematic of the invention of FIG. 3 is a composite scanning system adapted for weighted priority of control stations.

Figure 1:
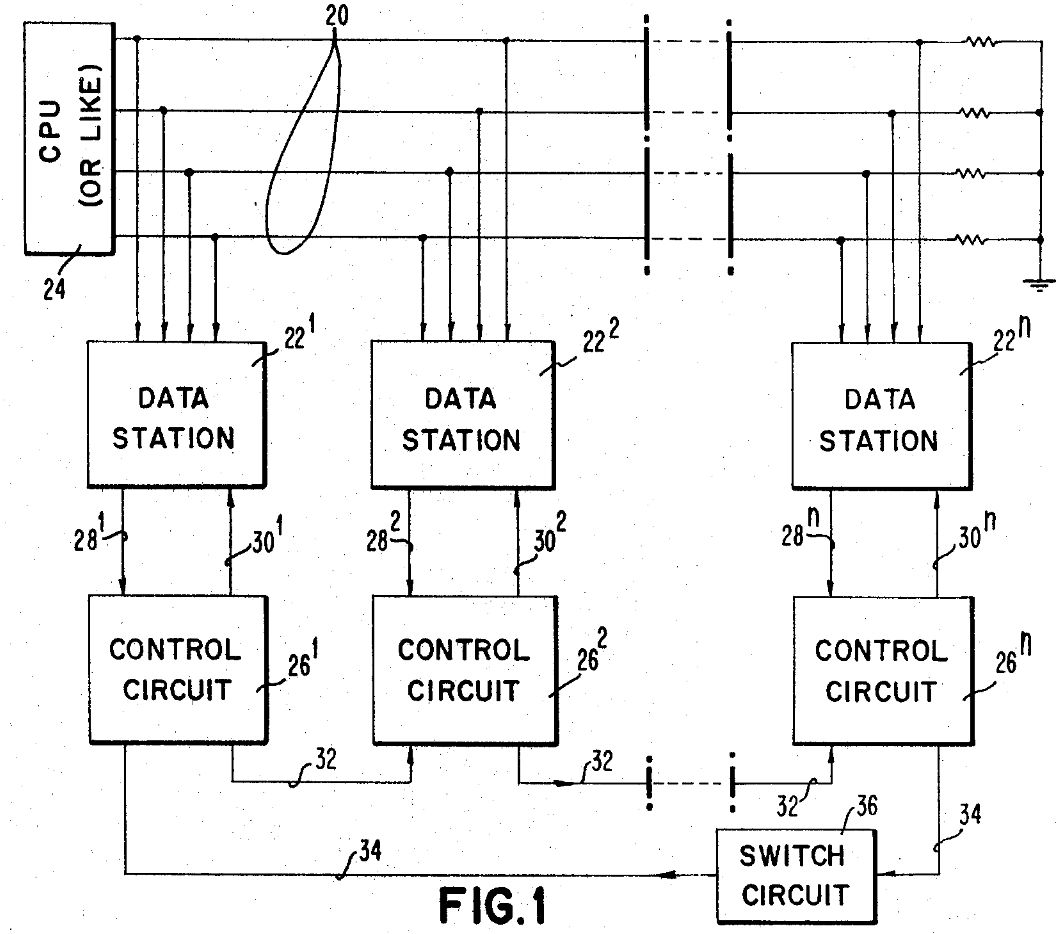
FIG. 1 is an electrical schematic of a common bus communication system employing the principles of the present invention.

Referring to FIG. 1, a common data bus 20 interconnects a receiving terminal 24 to a plurality of data stations 22$^1$, 22$^2$ . . . 22$^n$ including associated control circuit 26$^1$, 26$^2$ . . . 26$^n$, respectively. The common data bus includes a plurality of lines, one line for each character in the message, word or portion thereof. Each communication line may be a wire conductor, radio frequency, light beam or the like. Communication lines of this character are well known in the art and no further description is believed warranted. Likewise, the receiving terminal, which may be a data processor, computer or the like, is well known in the art and no further description is believed warranted. The data stations 22$^1$ . . . 22$^n$ may be Teletype units, reservation terminals, tape drives, printers or any combination of input/output apparatus. The details of interconnecting the data stations with the receiving terminal through the common bus are described in Ser. No. 357,369, referred to hereinbefore. Ser. No. 357,369 also provides description relative to the receiving terminal selecting a particular data station for data exchange purposes. In brief, the terminal places a unique address on the common bus which is solely recognized by the desired station and activated thereby.

The control stations 26$^1$, 26$^2$ . . . 26$^n$, in combination, function as a multiplex or scanning circuit and direct the connection of the data stations to the common bus. Each control circuit is connected to its data station by a request line 28 and an assignment line 30. All control circuits are interconnected through a first line 32 and a feedback line 34 which includes a switching circuit 36. The details of the control circuit and switching circuit will be given hereinafter.

In operation, the data stations are normally disconnected from the bus 20. The multiplex or scanning circuit searches the data stations for an active unit. A strobe pulse is generated at each control circuit in a predetermined sequence. The strobe pulse interrogates the data station for service requirements. A data station requires service or becomes active either upon receipt of an address transmitted by the receiving terminal or the need to transmit data to the receiving terminal. When the receiving terminal desires to forward data to a station, an address is placed on the data bus. The data station, assigned to that address, recognizes the call and places a signal on its request line to its control circuit. The control circuit recognizes the signal and stops scanning. When the scanning is terminated, a signal is placed on the assignment line 30 which activates the data station to receive the data from the receiving terminal. When data transmission terminates, the request line is dropped and the control circuit terminates the assignment line. Scanning resumes in the circuit until another request line is activated. When the data station desires to transmit information to the receiving terminal, the request line is activated and scanning terminated. The assignment line is activated. Thereafter, the address of the data station is transmitted to the receiving terminal. After recognition by the receiving terminal, the data is forwarded. The request line is dropped when all data has been transmitted to the receiving terminal, whereupon the control circuit terminates the assignment and scanning is resumed. The apparatus for decoding addresses, generating request signals and responding to assignment signals are believed to be well known to workers skilled in the art. Ser. No. 357,369, previously referred to above, provides details in this general area.

Having described the general operation of the invention, it is now believed in order to describe the particular details of the multiplex circuit and its operation.

Figure 2:
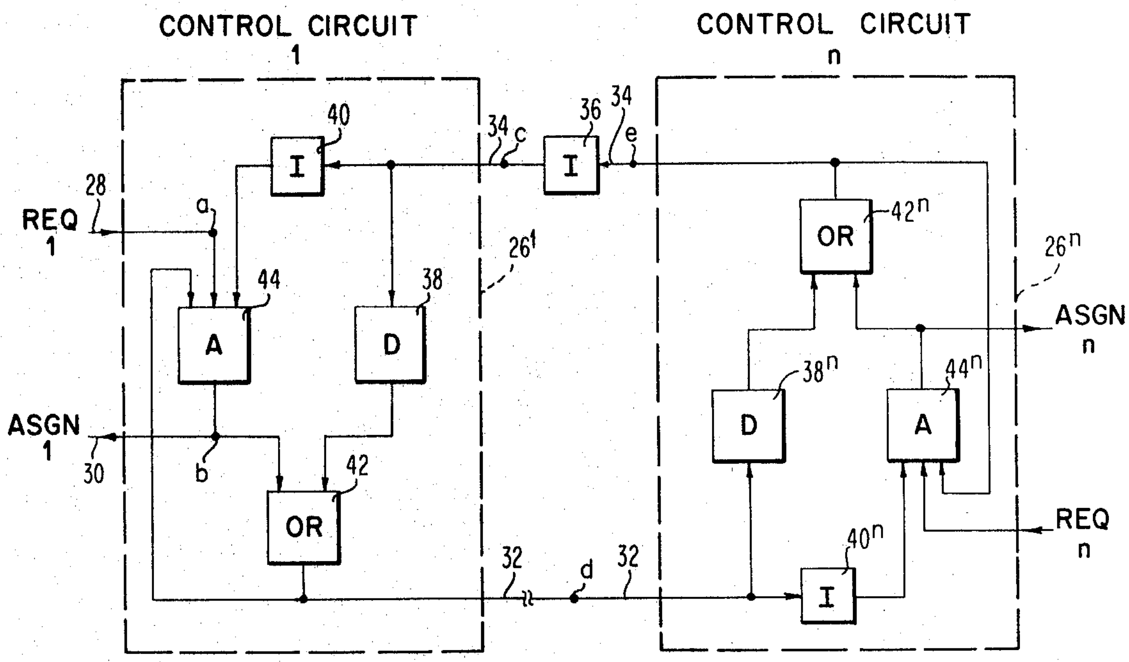
FIG. 2 is an electrical schematic of a plurality of control circuits employed in the communication system of FIG. 1.

Referring to FIG. 2, each control circuit 26$^1$ . . . 26$^n$ included in the multiplex circuit comprises a plurality of combinatorial logic circuits and other relatively simple elements. The feedback line 34 is connected as a first input to data station 26$^1$. The feedback line is connected to a delay means 38 and an inverter 40. The delay means may be any well known device, as for example, an LC line, a mercury delay line or the like. The output of the delay line is connected to a conventional OR logic circuit 42. Returning to the inverter 40, described, for example, in U.S. Pat. 3,075,089, the output thereof is provided to a conventional AND circuit 44. The other inputs to the AND circuit are the output of OR circuit 42 and the request line 28$^1$ which is a second input to the control circuit. The output of the AND circuit is provided as a second input to the OR circuit 42 and the input to the assignment line 30$^1$. OR circuit 42 provides the input to the first line 32 which connects to the next control circuit 26$^2$ as a first input. The other inputs to the control circuit 26$^2$ are the request line 28$^2$ and assignment line 30$^2$. The output from control circuit 26$^2$ is the line 32 which connects to the remaining control circuits in like manner to that described for control circuit 26$^2$. The control circuit 26$^n$ provides the input to the feedback line 34, which is returned to control circuit 26$^1$ through a switching circuit 36, typically an inverter, similar to the inverter 40 previously described.

The operation of the multiplex circuit will now be described in conjunction with FIGS. 2 and 3, the latter indicating the wave forms in the scanning circuit at particular points.

With none of the data stations active, the multiplex or scanning circuit will alternate between an active and a passive state. When the circuit is active at time *t*1 the wave front beginning at point *c* will propagate through the delay line 38, and OR gate 42 of control circuit 26[1] rendering the first line 32 and point *d* active. The output of inverter 40 is down and together with the downstate of request line 28 prevents the AND circuit 44 from providing an output. The first line 32, therefore, becomes active at time *t*2 and this active state is propagated to the next control circuit. The active state ripples through all of the data stations and at time 3 reappears at the switching circuit or inverter 36 which heretofore had been in a passive state. The inverter converts the active state to a passive state and at time *t*4 the point *c* becomes passive.

The passive state is supplied to both the delay line 38 and the inverter 40. At time *t*5 the line 32 becomes passive, the interval between *t*4 and *t*5 being equal to the delay period of delay line 38. Simultaneously, the passive wave front is translated by inverter 40 into an active state. The output of OR circuit 42 is also active before point *d* becomes passive. Thus, the appearance of a signal on the request line will provide an output from AND circuit 44 and generate a signal on the assign line 40. The interval between *t*4 and *t*5, therefore, represents the strobe or search signal 41 provided to the data station 26[1]. The absence of a signal on the request line permits the passive state to appear at the next data station. The passive wave front, in the absence of an active request line, ripples through the remaining control stations and reappears at the inverter 36 at time *t*6. The active state is recreated at time *t*7 by the inverter 36 at point *c* and the process is repeated. The cyclic action continues at a frequency determined by the magnitude of the delays in each stage and the combinatorial logic associated therewith.

When a request line 28 becomes active, for example 28[1], at time *t*8, the input to delay line 26[1] will be passive and the output from inverter 40 will be active. Since the output of OR circuit 42 will also be active, all inputs to AND circuit 44 are active and an active output is provided at point *d* and on assignment line 30. The OR circuit 42 responds to the output of the AND circuit and the arrival of the passive state from delay line 38 will have no effect on the state of the ring. In effect, the ring is "locked up" with data station 26[1] receiving an "assigned" signal via the assignment line 30[1]. The data station employs this signal to either transmit or receive information from the receiving terminal, as circumstances dictate. The ring will remain in this "locked up" state until the request line 28[1] goes passive at time *t*9. The passive state is provided as an output from the OR circuit 42 at time *t*10 and will ripple through the other control circuits. Any control circuit having an active request line will be serviced before the wave front proceeds. The passive state will finally arrive at the inverter 36 and be converted into an active state by inverter 36 for repetition of the process.

Recapitulating the operation of the scanning circuit, it will be seen that a series of control circuits are interconnected and include a feedback path which establishes a loop oscillator internal to the data stations. That is to say, no outside circuitry controlled by the receiving terminal directs the scanning of the data stations for service. The loop oscillator generates a transitional wave front that ripples through the control circuits. The wave front for one interval, i.e. passive edge, functions as a strobe signal relative to the various data stations. The wave front is terminated when a data station indicates a need for service by activating the request line. The wave front is not resumed until the data station has been serviced. The frequency of the wave front is governed entirely by the internal elements of each circuit, notably the delay line. The loop oscillator is essentially asynchonous and independent of the receiving terminal. Moreover, the scanning circuit is compatible with data stations of all data rates. This compatibility results from the fact that the loop oscillator is terminated until service is completed to a data station. The simplicity of each control circuit, ease of construction and versatility in operation provide a communication multiplexing circuit which will improve the performance of information handling systems.

A plurality of multiplexing circuits can be combined into a weighted priority multiplexing circuit, as shown in FIG. 4. The data stations, communication bus and receiving terminals have been omitted for reasons of brevity. FIG. 4 will solely describe the operation of the control circuits. It is understood that when a control station is selected the data station associated therewith will be able to transmit or receive information, for reasons previously described.

Referring to FIG. 4, like elements to those described in FIGS. 1 and 2 will have corresponding reference characters. Three scanning circuits, designated branch 1, branch 2 and branch *n*, are shown. The input to each scanning circuit is from an AND circuit 50–1, 50–2 or **50–*x*. Each control circuit, of course, receives an input from the data station on line 28 and provides a first output to the data station on line 30. The output from each branch is supplied to an OR circuit 52. The output from the OR circuit, which is part of a common feedback loop, is provided to inverter 36 in series with a delay line 54. The output from the delay line 54 is multiplied as a first input to AND circuits 50–1, 50–2 and 50–3. Returning to the inverter 36, an output is also provided to a conventional single shot 56, described, for example, in U.S. Pat. 3,215,852, the output of which is provided to a ring counter 58, described, for example, in U.S. Pat. 3,149,242, and an inverter 60. The output of the inverter 60 is also multiplied to the AND circuits 50–1, 50–2 and 50–3** as a second input. The ring circuit may be of any number of stages depending upon the priority systems desired for the scanning circuits.

In one form, the output from stage 0 of the ring counter is provided as a third input to AND circuit 50–1. The output from stages 1 and 2 is supplied to OR circuit 62, which provides the third input to AND circuit 50–2. The output from stages 3, 4 and 5 is supplied to OR circuit 64 which provides the third input to AND circuit **50–*n*. Stage 5 of the shift register also provides a second output which is returned to stage 0 as a second input 66. Priority is accomplished among the loops by steering the propagating active and passive states through the individual branches in a predetermined but readily alterable sequence. The counter permits branch 1 of the scanning circuit to be activated when the 0 stage of the counter is active. Branch 2** is active when the first or the second stages of the counter are active, and branch *n* when the third, fourth or fifth stages of the counter are active. Manifestly, the ring counter may be connected to the branches in other forms, the present being selected solely for purposes of description.

Stepping of the counter is accomplished by the single shot 56 which is triggered when node 68 becomes active with the passage of passive to active wavefront, the single shot being responsive to this wavefront and no other. The single shot output is adjusted to be of sufficient duration to permit the counter to shift, settle and the proper gate to be enabled. During this interval, all three steering gates are inhibited via the output of logic inverter 60. Upon termination of the single shot output, the inhibit is removed and the active state will propagate through the selected branch or branches followed by the subsequent passive state which will sample the control circuit contained in that branch. Should an active request be sensed, the operation will cease and an assignment will be made. When the request goes passive, operation will resume in the manner described in connection with FIGS. 2 and 3. It should be noted that delay line 54 has been included in the feedback loop. This delay is provided to insure that the inhibit will arrive at the steering gates prior to the arrival of the active state from node 68. For the particular counter connections shown, the scan sequence will be as follows:

| | | | | | | | | | | | | |
|---|---|---|---|---|---|---|---|---|---|---|---|---|
| Cycle | 1 | 2 | 3 | 4 | 5 | 6 | 7 | 8 | 9 | 10 | 11 | .... |
| Counter position | 0 | 1 | 2 | 3 | 4 | 5 | 0 | 1 | 2 | 3 | 4 | 5 .... |
| Branch | 1 | 2 | 2 | 3 | 3 | 3 | 1 | 2 | 2 | 3 | 3 | 3 .... |

The scanned sequence indicates that service is provided to the branches on a weighted basis. The weighted basis may be readily changed through alteration of logic circuits 62 and 64. Alternatively, the counter 58 may be expanded or reduced, as required, to obtain the desired scan sequence. The circuit shown in FIG. 4, however, provides more service to those data stations included in branch 3. Likewise, the service provided to the data stations in branch 2 is greater than that provided in branch 1. Accordingly, data stations having high data rates would be placed in branch 3, those with intermediate rates in branch 2 and those with minimal rates in branch 1. It is apparent that any number of branches may be provided which permits establishment of any number of priority levels. Further, the priority assigned to any branch is readily changed by simply moving the control circuit to the desired branch. The sequence in which branches are scanned is completely flexible. A ring counter, as noted above, may contain any number of stages which can be buffered together in any desired manner. Alternatively, the ring counter can be replaced with a binary counter or any similar multistate device and appropriate decode network included. Further, while the particular configuration illustrated is asynchronous in nature, it may be adapted for synchronous operation by introducing a logical product gate and a clock signal in a common section.

While the invention has been particularly shown and described with reference to preferred embodiments thereof, it will be understood by those skilled in the art that various changes in form and details may be made therein without departing from the spirit and scope of the invention.

What is claimed is:

1. A priority weighted multiplex circuit comprising a plurality of scanning circuits each including an input and an output, each scanning circuit associated with a plurality of data stations directly connected to a common receiving terminal and each adapted to generate a request signal for access to the terminal, means included in the scanning circuits to generate a continuous scan signal until a request signal is present and thereupon directly connecting the data station to the terminal, and means connected to the scanning circuits to control the passage of the scan signal through the scanning circuits.

2. The priority weighted multiplex circuit defined in claim 1 wherein the means for generating a search signal includes a feedback loop interconnecting the output of each scanning circuit to the input of said scanning circuits.

3. The priority weighted multiplex circuit defined in claim 2 wherein the feedback means includes a switching circuit and delay means.

4. The priority weighted multiplex circuit defined in claim 3 wherein the means controlling the passage of the search signal through the scanning circuits comprises a ring counter and a multistate device.

5. The priority weighted multiplex circuit defined in claim 4 wherein an inhibit circuit is connected between the multistate device and the input to the scanning circuits.

6. The priority weighted multiplex circuit defined in claim 5 wherein the output of the ring counter is connected to logic circuits which control the passage of the search signal to the scanning circuits.

7. In a data transmission system including a common receiving terminal, a plurality of data stations directly connected to the terminal, each station adapted to generate a request signal for access to the terminal, and a multiplexer for selectively accessing a data station to the terminal comprising:

a loop circuit including at least a plurality of control circuits, each control circuit including an assign line and a request line and associated with a data station, said loop circuit adapted to internally generate a scanning signal that continuously progresses through the control circuit until a data station provides a request signal on said request line whereupon the associated control circuit responds to the request and scanning signals to transmit an assign signal on the assign line to the data station which enables the data station for access directly to the terminal so long as the request signal is present.

8. The data transmission system defined in claim 7 wherein the control circuit includes a plurality of logic elements which, in response to the scanning signal, generate a search signal for a selected interval and thereafter transmits the scanning signal to the next control circuit.

9. The data transmission system defined in claim 8 wherein a first logic element responds to the scanning signal and provides a search signal to a second logic element, a third logic element operates on the scanning signal prior to the termination of the search signal and provides a second input to the second logic element, the second logic element responding to the simultaneous scanning, search and request signals to generate an assign signal and a fourth logic element which responds to the assign signal to terminal the scanning signal until the request signal is removed.

10. The data transmission system defined in claim 9 wherein the first logic element is a delay line, the second logic element is an AND circuit, the third logic element is an inverter, and the fourth logic element is an OR circuit.

11. The data transmission system defined in claim 10 further comprising monostable elements for determining the period of the scanning signal.

References Cited

UNITED STATES PATENTS

| | | | |
|---|---|---|---|
| 2,935,627 | 5/1960 | Schneider | 340—147 |
| 3,047,817 | 7/1962 | Schneider | 331—57 |
| 3,104,332 | 9/1963 | Yourke et al. | 328—104 |
| 3,199,801 | 8/1965 | Kok et al. | 340—147 |

KATHLEEN H. CLAFFY, Primary Examiner

A. B. KIMBALL, Jr., Assistant Examiner

U.S. Cl. X.R.

307—208; 328—92, 104; 340—147